(12) United States Patent
Vargo

(10) Patent No.: US 8,087,633 B2
(45) Date of Patent: Jan. 3, 2012

(54) CANVAS CARRIER AND HOLDER

(76) Inventor: Jeff Vargo, Lantana, FL (US)

( * ) Notice: Subject to any disclaimer, the term of this patent is extended or adjusted under 35 U.S.C. 154(b) by 351 days.

(21) Appl. No.: 12/430,947

(22) Filed: Apr. 28, 2009

(65) Prior Publication Data

US 2010/0019114 A1    Jan. 28, 2010

Related U.S. Application Data

(60) Provisional application No. 61/137,168, filed on Jul. 28, 2008.

(51) Int. Cl.
*B65G 7/00* (2006.01)
(52) U.S. Cl. ............ 248/441.1; 294/15; 281/15.1
(58) Field of Classification Search .......... 248/441.1, 248/448, 449, 446, 460, 463; 294/15, 26, 294/162; 281/15.1, 33
See application file for complete search history.

(56) References Cited

U.S. PATENT DOCUMENTS

| | | | | |
|---|---|---|---|---|
| 3,281,031 A | * | 10/1966 | Shapiro | 294/162 |
| 4,081,119 A | | 3/1978 | Messmore | |
| 4,156,498 A | | 5/1979 | Miller | |
| 4,275,863 A | * | 6/1981 | Hartman | 248/448 |
| 4,493,504 A | | 1/1985 | MacHose | |
| 4,881,771 A | | 11/1989 | Sullivan | |
| 5,069,411 A | * | 12/1991 | Murphy | 248/476 |
| 5,104,167 A | * | 4/1992 | Nemeth | 294/137 |
| 5,326,147 A | * | 7/1994 | Watson | 294/162 |
| 5,425,562 A | * | 6/1995 | Baldwin | 294/26 |
| 6,412,838 B1 | * | 7/2002 | Malamud | 294/15 |
| 7,533,916 B2 | * | 5/2009 | Eichenbaum | 294/159 |

* cited by examiner

*Primary Examiner* — Terrell McKinnon
*Assistant Examiner* — Steven Marsh
(74) *Attorney, Agent, or Firm* — Jacqueline Tadros, Esq.; Jacqueline Tadros, P.A.

(57) ABSTRACT

The present invention is a novel canvas carrier and holder formed of a single handle apparatus to which is anchored one or more flat J-Hooks and a method of using the canvas carrier holder.

4 Claims, 8 Drawing Sheets

CANVAS CARRIER AND HOLDER

CROSS-REFERENCE TO RELATED APPLICATIONS

Applicant claims priority from Provisional Patent Application No. 61/137,168 filed on Jul. 28, 2008 and entitled CANVAS HOLDER FOR EASEL under Title 35, United States Code Section 119(e). An entire copy of Provisional Patent Application No. 61/137,168 is incorporated herein by reference.

TECHNICAL FIELD OF THE INVENTION

The present invention relates to a portable canvas holder. More particularly, the portable canvas holder of the present invention is used for securing or transporting one or more framed canvasses.

BACKGROUND OF THE INVENTION

Oil paint remains wet longer than many other types of artists' materials and it is difficult and cumbersome to transport wet canvasses and paintings without jeopardizing the integrity of the art work. Thus, numerous devices for carrying and hauling canvasses and framed art work have been developed and are known in the art.

Many of these carrier devices however have several disadvantages and are inadequate for a variety of reasons. For example, carriers known in the art are often bulky. Others may require assembly and do not allow a user to paint on the canvas while the canvas is mounted on the easel.

Still yet, other carrier devices are limited in that they provide a means of transferring only one or a maximum of two canvasses at a time.

Carriers for transporting canvasses and framed art include a device known as the "Wet Canvas Carrier". A potential drawback in the use of The "Wet Canvas Carrier" is that it does not allow the artist to paint on the canvas while the device is in use. A further disadvantage is that the wet canvas must therefore be manipulated in order to utilize the carrier thereby increasing the likelihood of damaging the artistic integrity of the work.

U.S. Pat. No. 6,412,838 to Malamud for a "Carrier for a Framed Canvas" discloses a carrier that provides a means of transporting one or two framed canvasses at one time. A disadvantage in using the Malamud carrier is that if the canvasses need to be set down during transportation for one reason or another, the carrier would detach and thereafter need to be reattached. This is inconvenient and burdensome. In addition, the Malamud carrier can not be used while the artist is painting on a canvas mounted on an easel.

Other carriers include, U.S. Pat. No. 3,281,031 to Shapiro for "Carrier for Artists' Canvasses", U.S. Pat. No. 4,081,119 to Messmore for a "Carrying Case", U.S. Pat. No. 4,156,498 to Miller for a "Carrier for Framed Art Works" and U.S. Pat. No. 4,493,504 to MacHose for a "Carrier for Transporting Paintings and Other Substantially Planar Work".

The carriers thus disclosed however are bulky and larger than the canvasses they carry. They also do not allow the artist to paint on the canvas while it is mounted on an easel.

U.S. Pat. No. 4,881,771 to Sullivan discloses a "Carrier for Paintings" which is characterized by a box-like frame having an open front, a closed back and fitted with spacers for spacing the drawing or painted canvas surface from the closed rear panel of the frame. This carrier, although not bulky and burdensome, does not allow the artist to paint on the canvas while it is mounted on an easel or transport more than one canvas at a time with either hand.

A "Device for Carrying Artworks" is taught in U.S. Pat. No. 5,326,147 to Watson. The device includes a base for receiving the artwork and at least two adjustable clamps for clamping respective opposite edges of the artwork. A disadvantage of this device is that it is limited to transporting one artwork at a time with either hand.

It would be advantageous to have a carrier for securing and transporting one or more framed art or canvasses at one time with either hand and a carrier that is also able to secure multiple canvasses in a side by side configuration for transportation and also allows an artist to paint on one or more canvasses while the canvasses are mounted on one or more easels.

SUMMARY OF THE INVENTION

The present invention relates to a portable canvas holder and carrier for securing or transporting one or more canvasses.

The canvas holder comprises a handle portion and two or more flat J-shaped Hooks. The curved lower portion of the flat J-shaped Hooks engage the inner lip of a framed canvas to facilitate transportation of the framed canvas, and in particular wet canvasses such that the integrity of the work remains intact.

The canvas holder of the present invention may also be used on a framed canvas in conjunction with an easel without disturbing the artist's work. The upper easel clamp is secured to the handle portion of a first portable canvas holder and the lower easel shelf is secured to the handle portion of a second portable canvas holder.

While thus using the portable canvas holder of the present invention in this manner, the artist is provided with the freedom to paint to the farthest edges of the canvas and to remove the framed canvas from the easel and transport the work while the canvas surface is still wet without jeopardizing the art work by handling the canvas.

Some of the objects, features and advantages of the present invention are outlined hereunder. An object of the canvas carrier and holder of the present invention is to provide a means of transporting one or more wet canvasses.

An advantage of the present invention is that it is lightweight and portable and may be easily removed and stored.

Still yet a further advantage of the canvas holder of the present invention is that it may be used on a framed canvas while the canvas is mounted on an easel. The canvas may thereafter be picked up and carried using the present invention without handling the canvas and disturbing the wet paint.

In an alternative embodiment the canvas holder comprises an elongated substantially rectangular block member having a horizontal support and an elevated vertical support for holding a canvas frame in position while in use with an easel.

In a preferred embodiment multiple canvas holders may be used to secure multiple framed canvasses side by side and edge to edge on an easel while the artist paints. In the case of multiple canvasses, two or more embodiments of the present invention are utilized with at least one canvas holder and carrier engaging the upper canvas lip frames and at least one canvas holder and carrier engaging the lower canvas lip frames.

An object of the invention is to address the problem that arises when the easel shelf and clamp obstruct the upper and lower surface edges of the canvas by allowing the artist to paint to the farthest edges of the canvas unobstructed.

An advantage of the present invention is that it offers ease of use and does not require further assembly by the end-user.

An advantage of the present invention is that each unit is self contained and may be used individually or in combination with other units to accommodate the user and the situation.

There has thus been outlined, rather broadly, the more important features of the invention in order that the detailed description thereof may be better understood and in order that the present contribution to the art may be better appreciated.

These as well as additional advantages of the present invention will become apparent of the following detailed description of the present invention when read in light of the several figures.

DETAILED DESCRIPTION OF THE INVENTION

Figure 1:
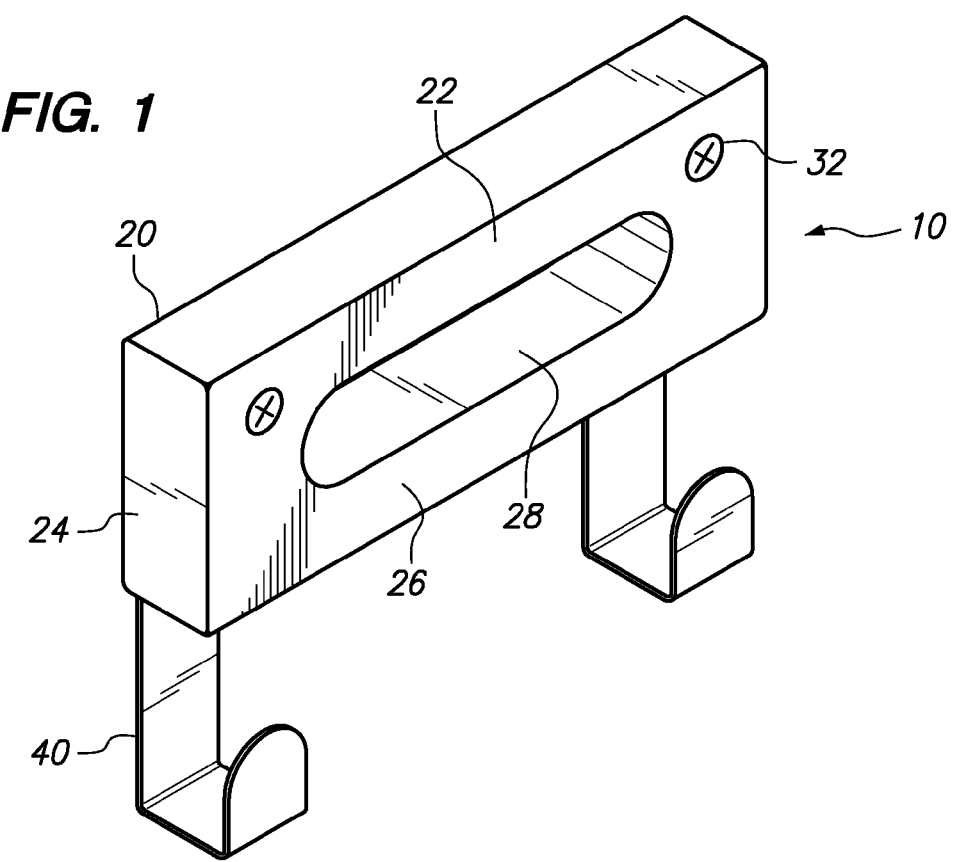
FIG. 1 is a front perspective view of the canvas holder of the present invention.

The canvas carrier and holder of the present invention is formed of a single handle apparatus to which is anchored one or more flat J-Hooks. In utilizing J-Hooks secured to a handle apparatus, the subject invention provides a novel improvement over other canvas carriers. The canvas carrier and holder of the present invention will be easy to manufacture and require no assembly by the end user. In addition, it can be formed of varying sizes and material to accommodate a plurality of canvasses and canvas dimensions. It will be readily apparent to one skilled in the art that it be desirable for the canvas carrier and holder of the present invention to exhibit a tensile strength of up to forty pounds per square inch.

Referring now to the drawings, FIGS. 1 to 4 show a canvas carrier holder 10 including a handle apparatus 20. The handle apparatus 20 is formed of a single manufactured piece. The handle apparatus 20 includes a handle grasp member 22 opposing and complimentary handle risers 24, a bottom handle bar 26 and an aperture 28 disposed substantially in the center of the handle apparatus 20 and dimensioned to accept the fingers of a human hand 29 intended to grasp the handle grasp member 22 when in use.

Figure 12:
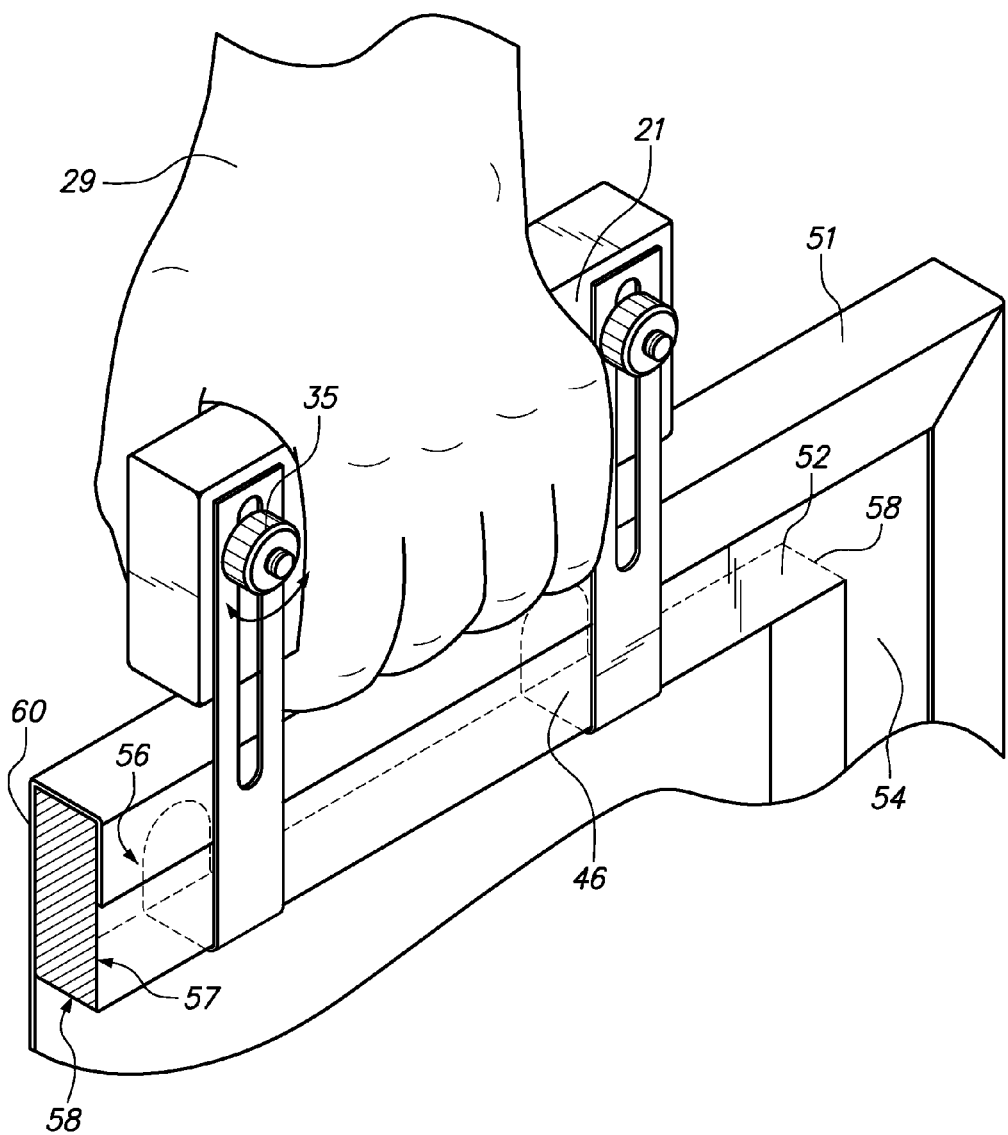
FIG. 12 is a sectional rear perspective view of an alternative embodiment of the present invention in use with a single canvas.

In an alternative embodiment the handle apparatus 20 is formed of a single manufactured piece wherein the handle apparatus 20 functions largely as a solid handle grasp member 21. In this embodiment, the solid handle grasp member 21 is of a height, width and length to comfortably accommodate the grasp of a human hand 29. The handle apparatus 20 in this embodiment does not include handle risers 24, a bottom handle bar 26 or aperture 28 as shown in FIG. 12.

The handle apparatus 20 includes at least one bore 30 for receiving through it a securing screw 32 to fasten a flat J-Hook 40 to the handle apparatus 20. The securing may be accomplished with a screw or any appropriate securing means.

Figure 2:
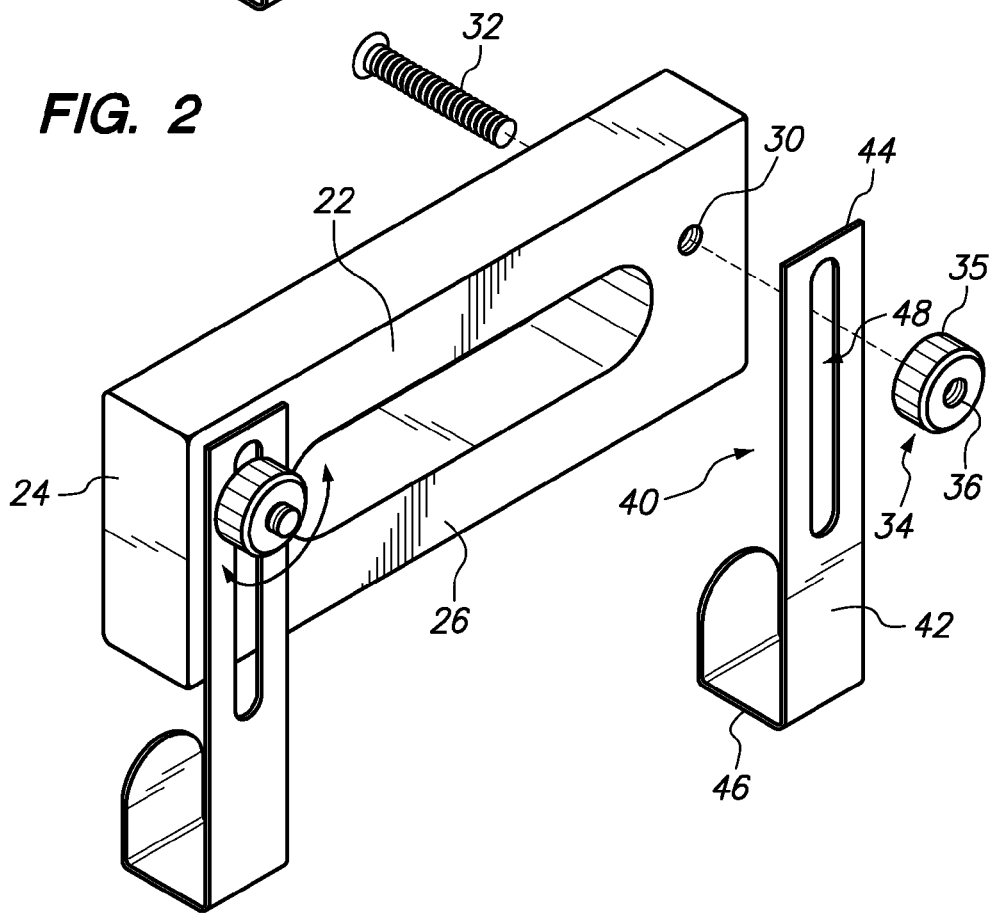
FIG. 2 is an exploded view taken in rear perspective of the canvas holder of the present invention.
Figure 3:
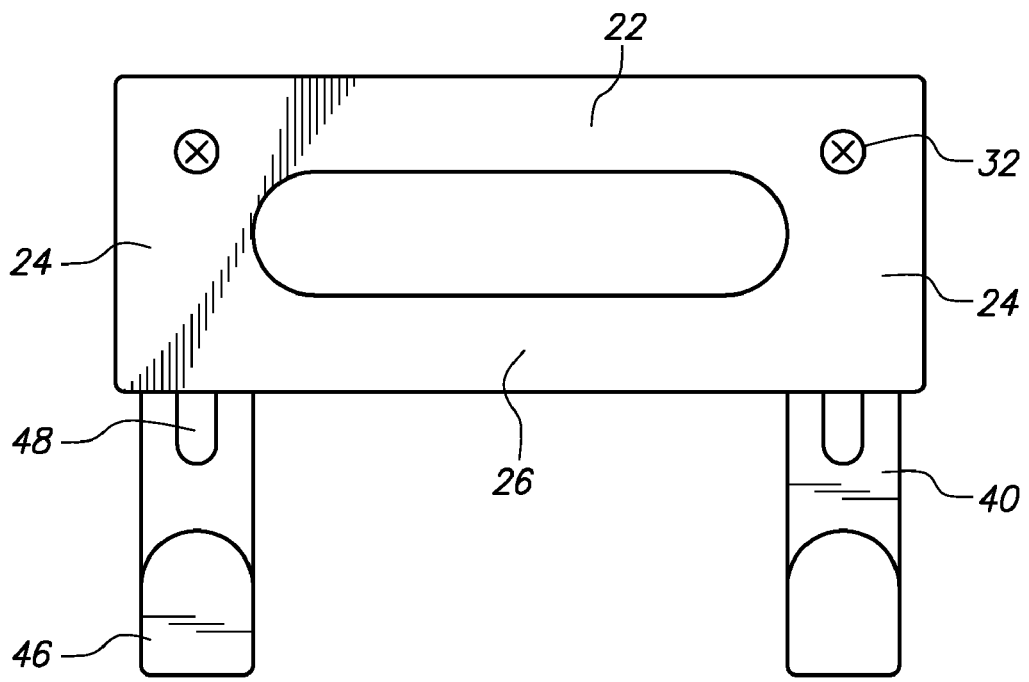
FIG. 3 is a front view of the present invention.
Figure 4:
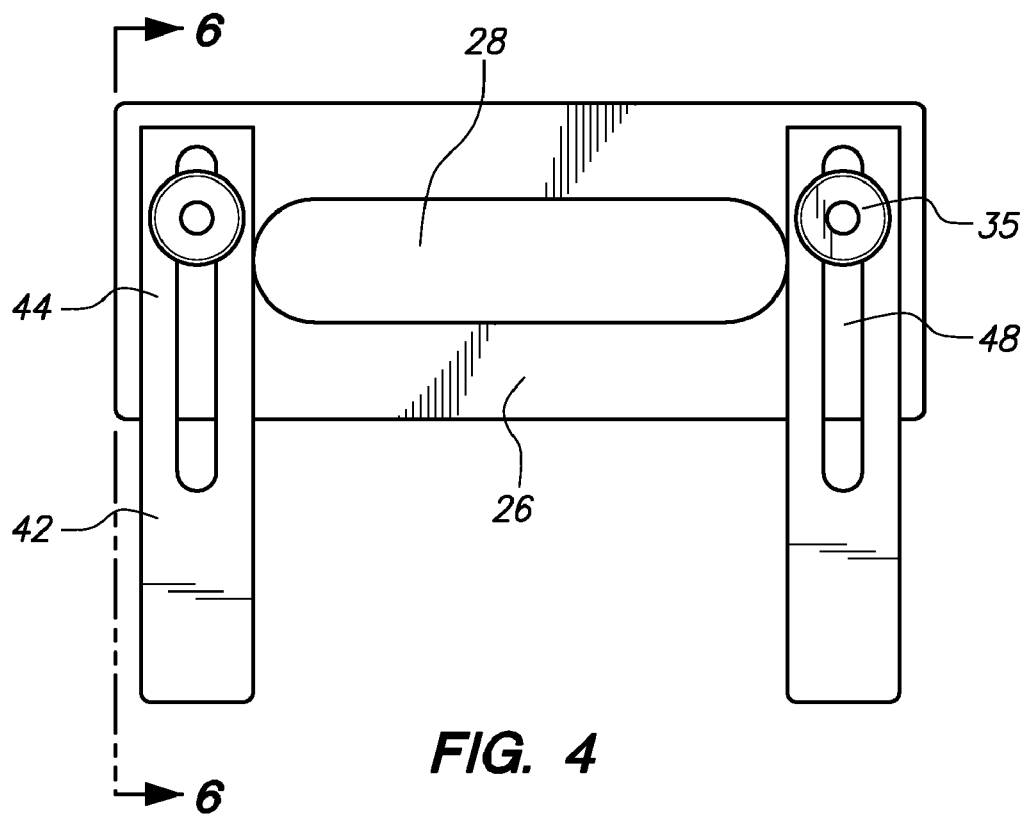
FIG. 4 is a rear view of the present invention.
Figure 5:
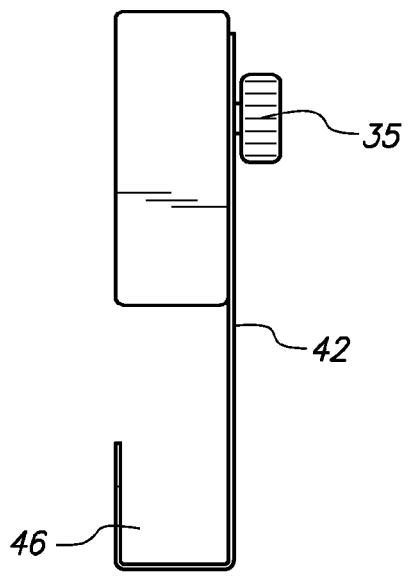
FIG. 5 is a side view of the present invention.

FIG. 2 shows an exploded view taken in rear perspective showing an embodiment of the canvas holder and carrier of the present invention 10. The J-Hook 40 of the present invention is flat and elongated with a main body portion 42 a straight upper end 44 and a curve at the bottom end 46, resembling the shape of the letter "J", with the entire J-Hook 40 preferably being integrally formed of a single sheet of metal or hard plastic having a thickness that permits it to be inserted and removed through a gap 56 defined by inner and outer frame lips 52, 54 in conjunction with a main canvas frame body 50 as shown in FIGS. 6, 10 and 12.

The J-Hook 40 of the present invention is affixed to the handle apparatus 20 such that the vertical plane of the main body 42 of the J-Hook is at a 90° right angle relative to the horizontal plane of the handle apparatus 20. The main body portion 42 of the J-Hook 40 has a length substantially greater than the length of the canvas lip frame 57.

FIG. 12 shows an alternative embodiment in which the main body portion 42 of the J-Hook 40 has a length substantially greater than the length of the canvas lip frame 57 to allow for the fingers of a human hand to grasp the handle apparatus when in use.

Figure 6:
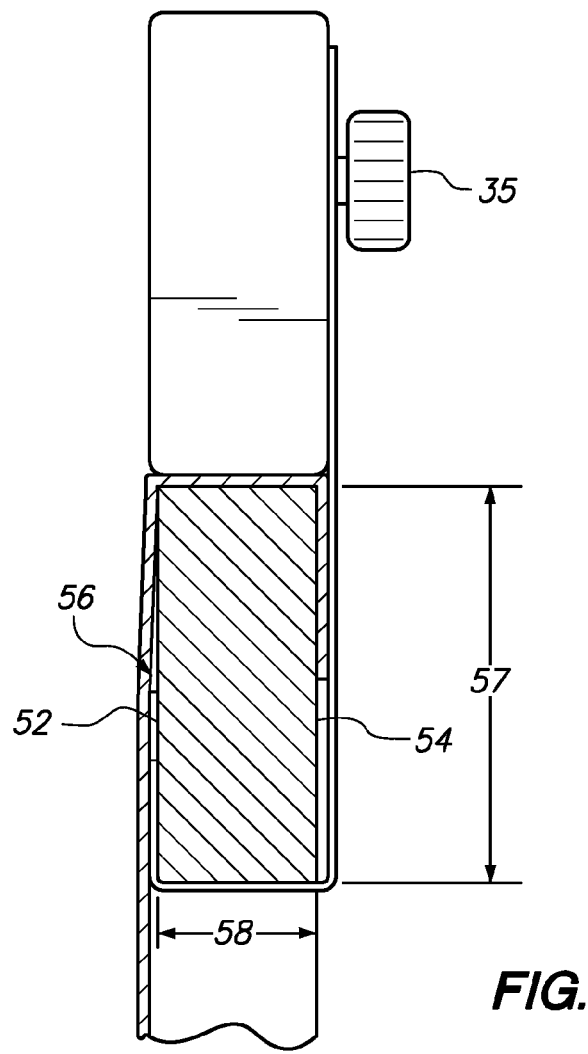
FIG. 6 is a sectional view taken in rear perspective of the present invention in use with a canvas.
Figure 10:
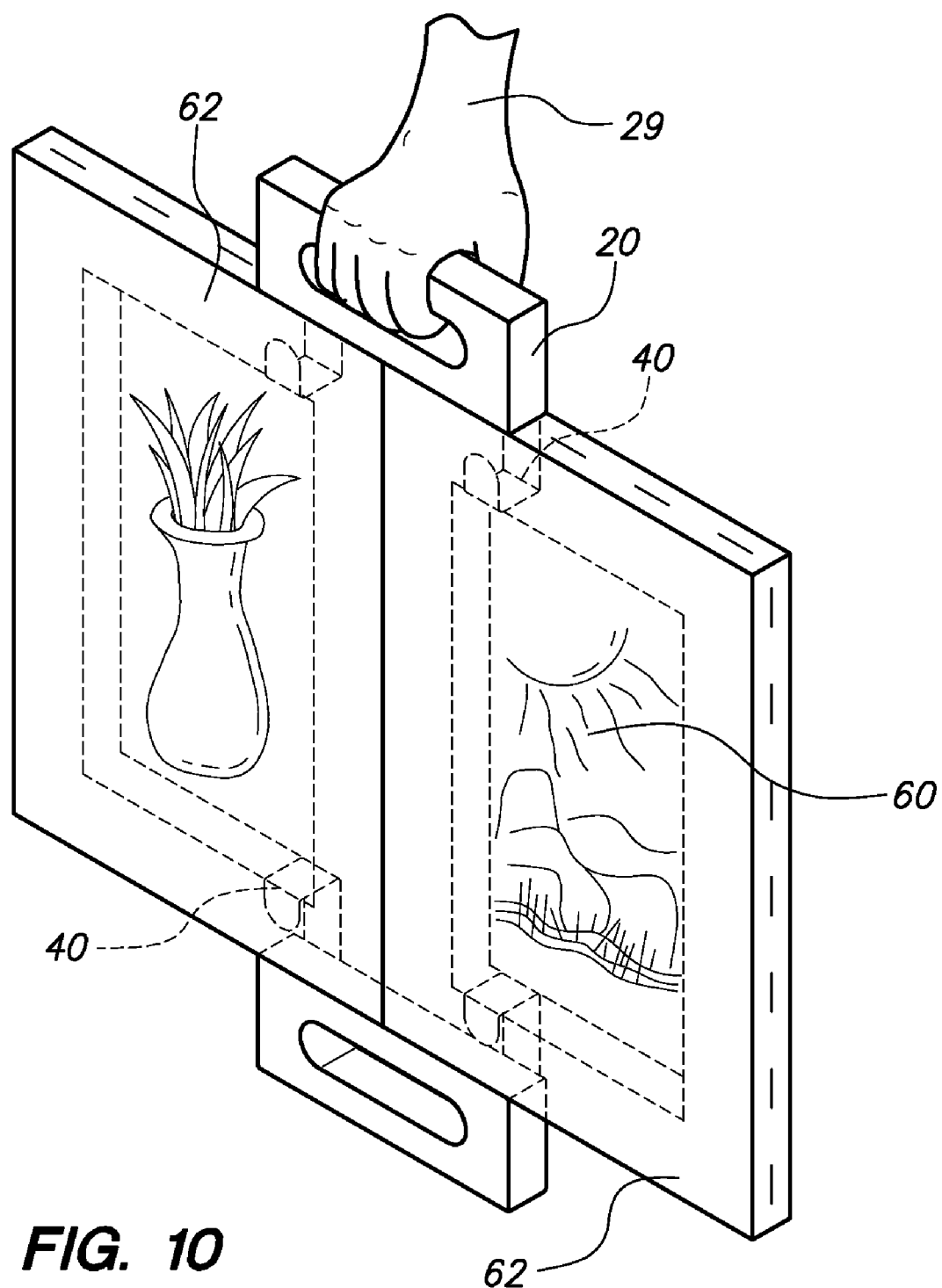
FIG. 10 is a front perspective view of an embodiment of the present invention in use carrying two side by side canvasses.

The bottom "J" portion 46 of the flat J-Hook 40 has a width and length dimensioned to receive a canvas lip width 58 of a main canvas frame body 50 as shown in FIGS. 6, 10 and 12.

The straight upper end 44 of the J-Hook 40 includes an elongated slot 48 through which passes a knob 34 for mounting and securing the J-Hook 40 to the handle apparatus 20. The interior of the knob 34 is threaded 36 for fastening to the securing screw 32. The knob handle 35 has a diameter exceeding the diameter of the elongated slot for locked attachment. As may be readily appreciated by those skilled in the art, the J-Hook 40 may be secured into place by other suitable means.

Rotating the knob 34 clockwise or counter-clockwise increases or decreases the tension accordingly. The tension is decreased to insert the bottom end "J" portion 46 of the J-Hook 40 between the gap 56 defined by the inner and outer frame lips 52, 54 in conjunction with the main canvas frame body 50. As shown in FIGS. 6, 10 and 12, once the J-Hook 40 and main canvas frame body 50 are contemporaneously engaged in position, the knob 34 is rotated clockwise to increase the tension and secure the canvas carrier holder 10 to the canvas frame body 50

Figure 7:
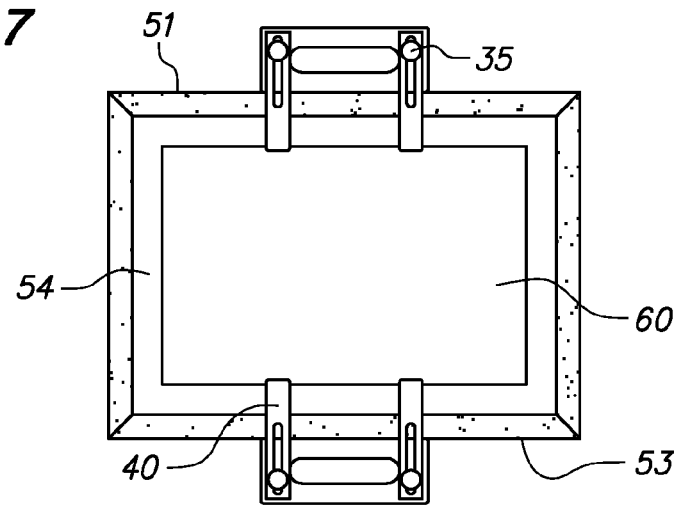
FIG. 7 is a rear view showing an embodiment of the present invention in use with a single canvas.
Figure 8:
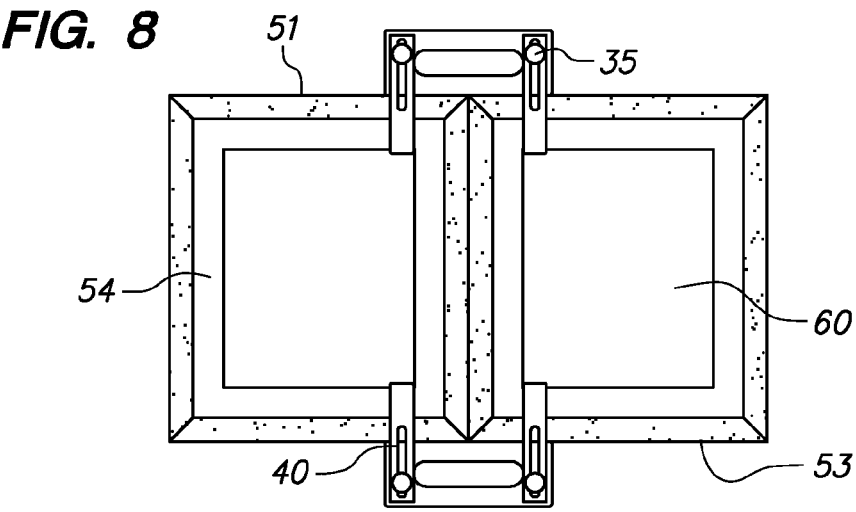
FIG. 8 is a rear view showing an embodiment of the present invention in use with two side by side canvasses.
Figure 9:
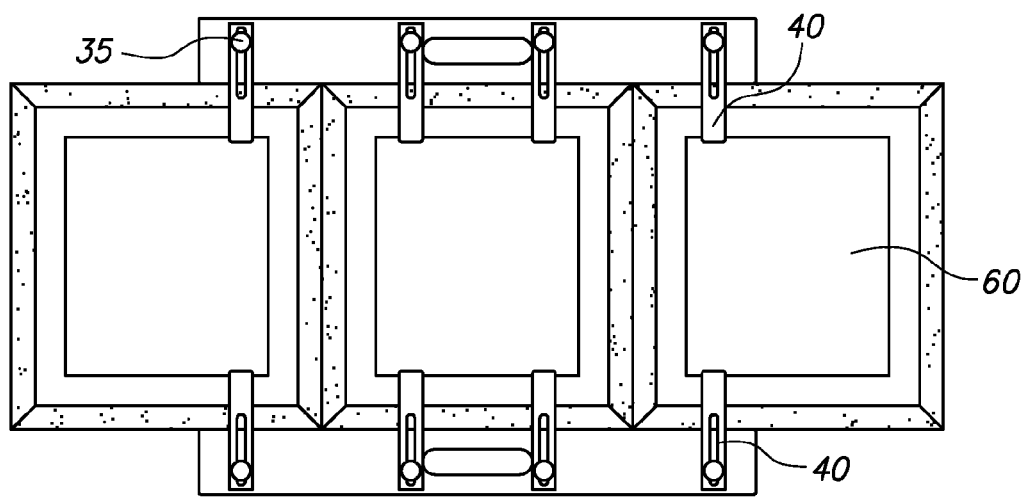
FIG. 9 is a rear view showing an embodiment of the present invention in use with three side by side canvasses.

FIGS. 7 to 9 show a rear view of an embodiment of the present invention. The canvas carrier holder 10 contemporaneously secures two side by side canvasses 60 as shown in FIG. 8. The bottom "J" portion 46 of the J-Hooks 40 are positioned between the gap 56 defined by the inner and outer frame lips 52, 54 in conjunction with the main canvas frame body 50 of the canvasses 60 to engage the canvas frame 50 of each canvas 60 as shown in FIGS. 6, 10 and 12. As can be readily appreciated, two canvas carrier holders 10 may be used to secure the canvasses 60. A canvas carrier holder 10 is secured on one canvas 60 at the top end 51 of the canvas frames 50 and another canvas carrier 10 is secured at the bottom end 53 of the canvas frame 50 as shown in FIG. 7.

In a preferred embodiment a plurality of J-Hooks 40 are mounted on a single handle apparatus 20. FIG. 9 shows four J-Hooks 40 affixed to each handle apparatus 10 of the canvas carrier holder 10. In this embodiment two units of the canvas carrier and holder 10 of the present invention are utilized to secure three canvasses 60 in a side by side configuration with one canvas carrier 10 affixed to the top canvas frame 51 and another canvas carrier and holder 10 is affixed to the bottom canvas frame 53 for maintaining stability and equilibrium while in transit.

Figure 11:
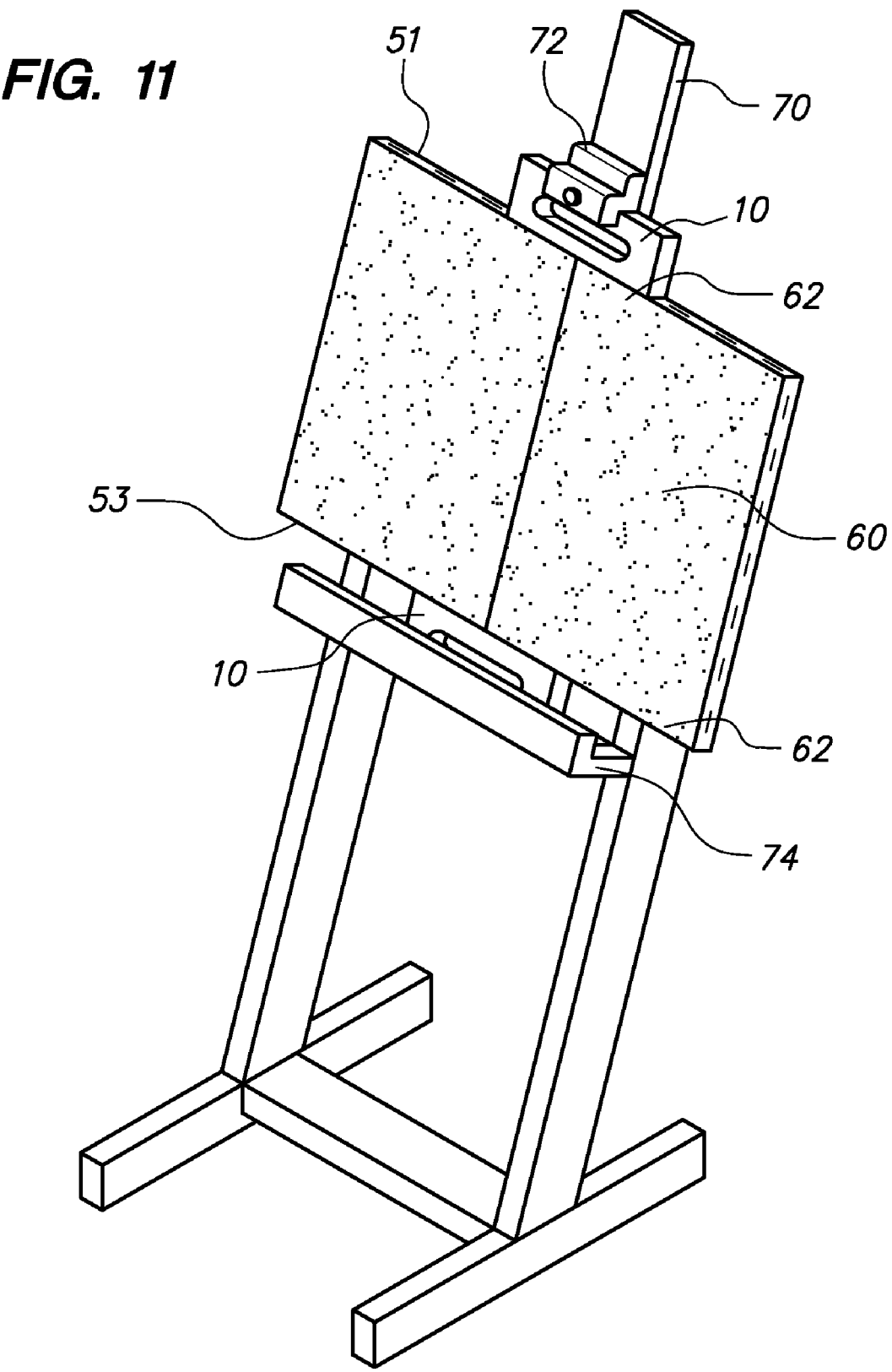
FIG. 11 is a front perspective view of an embodiment of the present invention securing two side by side canvasses in conjunction with an easel.

FIG. 11 shows two canvasses 60 in a side by side configuration mounted on an easel 70 with one unit affixed to the top canvas frame 51 and another unit affixed to the bottom canvas frame 53. An easel clamp 72 secures the first canvas carrier and holder 10 to the easel 70 and a second canvas carrier and holder 10 rests on a lower easel shelf 74. This mode of use secures the canvas 60 to the easel 70 and also allows the artist to make full use of the entire canvas by painting freely to the outermost edge 62 of the canvasses 60 without encumbrance from the easel clamp 72 or lower easel shelf 74.

Figure 13:
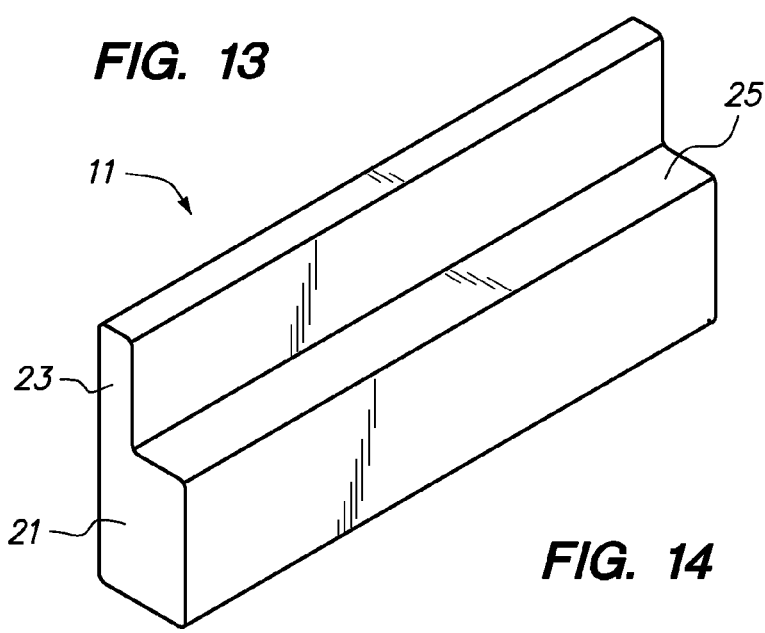
FIG. 13 is a perspective view of an alternative embodiment of the present invention.
Figure 14:
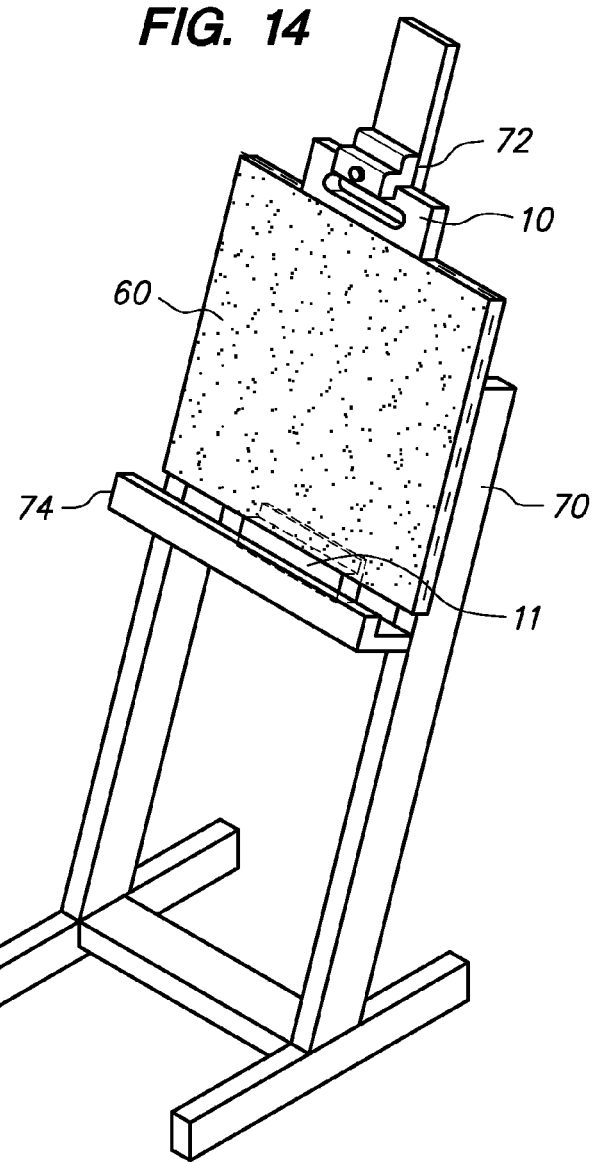
FIG. 14 is a perspective view of two alternative embodiments of the present invention securing a canvas in conjunction with an easel.

FIGS. 13 to 14 show an alternative embodiment of a canvas holder 11 formed of a substantially rectangular elongated block member 21 having a horizontal support 25 and an elevated vertical support 23 for holding a main canvas frame 50 in position while in use with an easel 70. FIG. 14 shows the easel clamp 72 secured to the canvas carrier holder 10 of the present invention, while the canvas carrier holder 10 is secured to the top canvas frame 51. The canvas holder 11 rests on the lower easel shelf 74 and elevates the bottom canvas frame 53 to allow the artist to make full use of the canvas 60.

In an alternative embodiment not shown herein, the handle apparatus 20 may be in the shape of a T-bar. As will be appreciated by one reasonably skilled in the art, the handle grasp member 22 may be of various shapes, sizes and dimensions without departing from the spirit and scope of the invention.

While the invention has thus been described with some degree of particularity, it is understood that this description has been given only by way of example and that numerous changes in the details of construction, fabrication and use, including the combination and arrangement of parts, may be made without departing from the spirit and scope of the invention.

I claim:

1. A method of holding and carrying a framed canvas comprising the steps of:
    (a) Providing a canvas carrier and holder apparatus comprising a handle apparatus including a handle grasp member, a flat elongated J-Hook formed of a single manufactured piece and having a main body portion, a straight upper end, and a bottom end, said bottom end resembling the shape of the letter "J" and having a width, length and thickness that permits it to be inserted and removed through a gap, said gap being defined by inner and outer frame lips in conjunction with a main canvas frame body; securing means to secure said J-Hook to said handle apparatus such that said straight upper end is at a 90° right angle relative to said horizontal plane of said bottom handle bar; and tension adjustment means for adjusting the tension of said securing means;
    (b) manipulating said tension adjustment means for releasing tension for positioning said bottom end between a gap defined by inner and outer frame lips in conjunction with a canvas frame body for locked engagement of said J-Hook and said canvas frame body;
    (c) manipulating said tension adjustment means for increasing tension for securing said J-Hook to said canvas frame body; and
    (d) affixing a first and second canvas carrier and holder to opposing ends of a canvas frame body.

2. A method according to claim 1, wherein a plurality of J-Hooks are affixed to at least one handle apparatus for securing multiple canvases in a side by side configuration.

3. A method according to claim 1 further comprising the step of:
    (a) positioning said first canvas carrier on a lower easel shelf and securing an easel clamp to said second canvas carrier for securing said canvas frame body to an easel.

4. A method according to claim 1, wherein a plurality of canvas carrier and holders secure multiple canvases in a side by side configuration.

* * * * *